(12) United States Patent
Saitoh

(10) Patent No.: US 10,061,661 B2
(45) Date of Patent: Aug. 28, 2018

(54) MANAGING THE EXECUTION OF SOFTWARE APPLICATIONS RUNNING ON DEVICES HAVING DEVICE FUNCTIONS

(71) Applicant: International Business Machines Corporation, Armonk, NY (US)

(72) Inventor: Akira Saitoh, Ichikawa (JP)

(73) Assignee: International Business Machines Corporation, Armonk, NY (US)

( * ) Notice: Subject to any disclaimer, the term of this patent is extended or adjusted under 35 U.S.C. 154(b) by 121 days.

(21) Appl. No.: 15/181,660

(22) Filed: Jun. 14, 2016

(65) Prior Publication Data

US 2017/0357555 A1    Dec. 14, 2017

(51) Int. Cl.
*G06F 11/07* (2006.01)
*G06F 11/14* (2006.01)
(Continued)

(52) U.S. Cl.
CPC .......... *G06F 11/1471* (2013.01); *G06F 9/461* (2013.01); *G06F 9/485* (2013.01);
(Continued)

(58) Field of Classification Search
CPC ............... G06F 11/1402; G06F 11/143; G06F 11/1438; G06F 11/1471
(Continued)

(56) References Cited

U.S. PATENT DOCUMENTS 5,251,227 A * 10/1993 Bruckert ................ G06F 1/24
                                                   714/23
5,715,386 A *  2/1998 Fulton, III .......... G06F 11/1438
                                                   714/15
(Continued)

FOREIGN PATENT DOCUMENTS

EP    1974286 B1    11/2015
JP    2004030092 A    1/2004
(Continued)

OTHER PUBLICATIONS

IBM Appendix P., "List of IBM Patents or Patent Applications to be Treated as Related", Dated Nov. 10, 2017, 2 pages.
(Continued)

*Primary Examiner* — Chae M Ko
(74) *Attorney, Agent, or Firm* — Aaron N. Pontikos; Steven L. Fisher-Stawinski

(57) ABSTRACT

A computer-implemented method includes running a software unit in an isolation container located on a software platform. The computer-implemented method further includes allocating an instance of a device function instantiated by the software platform to the software unit. The computer-implemented method further includes storing usage data associated with the instance to a memory region logically external to the isolation container, the usage data being generated by the software unit operating the device function. The computer-implemented method further includes detecting a failure of the software unit. The computer-implemented method further includes, responsive to detecting the failure, restarting the software unit and providing the software unit with a usage context, wherein the usage context comprises at least one of identifying information and the usage data associated with the instance stored in the memory region logically external to the isolation container. A corresponding computer system and computer program product are also disclosed.

6 Claims, 16 Drawing Sheets

(51) Int. Cl.
*G06F 9/54* (2006.01)
*G06F 9/46* (2006.01)
*G06F 9/48* (2006.01)

(52) U.S. Cl.
CPC .......... *G06F 9/542* (2013.01); *G06F 11/1417* (2013.01); *G06F 2201/805* (2013.01); *G06F 2201/84* (2013.01); *G06F 2201/85* (2013.01)

(58) Field of Classification Search
USPC .......................................................... 714/16
See application file for complete search history.

(56) References Cited

U.S. PATENT DOCUMENTS

| | | | |
|---|---|---|---|
| 6,629,266 B1* | 9/2003 | Harper | G06F 11/1438 714/38.1 |
| 7,243,267 B2 | 7/2007 | Klemm et al. | |
| 7,624,352 B2 | 11/2009 | Colleran et al. | |
| 7,941,700 B2 | 5/2011 | Schlesinger et al. | |
| 8,874,954 B1* | 10/2014 | Gupte | G06F 11/2028 714/1 |
| 2005/0038801 A1* | 2/2005 | Colrain | G06F 11/1443 |
| 2005/0204203 A1* | 9/2005 | Yang | G06F 11/0742 714/42 |
| 2006/0200450 A1* | 9/2006 | Keane | G06F 17/30595 |
| 2009/0276771 A1* | 11/2009 | Nickolov | G06F 9/4856 717/177 |
| 2010/0011243 A1* | 1/2010 | Locasto | G06F 11/1438 714/15 |
| 2013/0185586 A1* | 7/2013 | Vachharajani | H04L 45/44 714/2 |
| 2014/0245077 A1* | 8/2014 | Kanso | G06F 11/1482 714/47.3 |

FOREIGN PATENT DOCUMENTS

| | | |
|---|---|---|
| JP | 4517923 B2 | 8/2010 |
| JP | 2012121533 A | 6/2012 |
| JP | 5120125 B2 | 1/2013 |

OTHER PUBLICATIONS

Saitoh, Akira, "Managing the Execution of Software Applications Running on Devices Having Device Functions", U.S. Appl. No. 15/809,278, filed Nov. 10, 2017, pp. 1-37.

* cited by examiner

| INSTANCE IDENTIFIER OF DEVICE FUNCTION | USAGE DATA | EVENT HANDLER FLAG |
|---|---|---|
| A1 | DATA1, DATA2,... | TRUE |
| A2 | DATA3, DATA4,... | TRUE |
| ⋮ | ⋮ | ⋮ |

| INSTANCE IDENTIFIER OF DEVICE FUNCTION | APPLICATION'S EVENT HANDLER |
|---|---|
| A1 | AH1 |
| A2 | AH2 |
| ⋮ | ⋮ |

MANAGING THE EXECUTION OF SOFTWARE APPLICATIONS RUNNING ON DEVICES HAVING DEVICE FUNCTIONS

BACKGROUND

The present disclosure relates generally to managing the execution of software applications and in particular to managing software applications running on devices having device functions.

The advent of applications that run on processing devices, such as vehicle navigation systems and vehicle entertainment systems, has led to an increase in the number of software platforms (i.e., application platforms) necessary to manage these applications. In addition to the applications that may run on these processing devices, the processing devices in themselves have their own operating systems and software components to carry out various device functions (e.g., mapping components, media player components, etc.). When an application running on a processing device abnormally fails due to a software error, the application must be "restarted" or "rebooted". However, after restarting or rebooting the application, the data associated with the processing device's context prior to the failure may be lost.

SUMMARY

A computer-implemented method includes running a software unit in an isolation container located on a software platform. The computer-implemented method further includes allocating an instance of a device function instantiated by the software platform to the software unit. The computer-implemented method further includes storing usage data associated with the instance to a memory region logically external to the isolation container, the usage data being generated by the software unit operating the device function. The computer-implemented method further includes detecting a failure of the software unit. The computer-implemented method further includes, responsive to detecting the failure, restarting the software unit and providing the software unit with a usage context, wherein the usage context comprises at least one of identifying information and the usage data associated with the instance stored in the memory region logically external to the isolation container. A corresponding computer system and computer program product are also disclosed.

DETAILED DESCRIPTION

Processing devices (e.g., smartphone, tablet, smartwatch, vehicle navigation system, vehicle entertainment system, etc.) may have device functions provided by software components other than those functions provided by an application (i.e., "app") and its corresponding application platform. An application platform manages the execution of software app running on the processing device. Here, the device functions provided by software components of the processing device may communicate with the application platform through application programming interfaces (i.e., "APIs") upon selection of a device function by a user. For example, on a vehicle navaigation system, upon selecting thedisa device function "display entire screen" (e.g., via selection of a button or a touchscreen) a map may be displayed on the entire screen. Similarly, upon selecting the device function "display brightness" the brightness of the map may be altered. Accordingly, a user may adjust the settings of a processing device according to the user's preferences. However, applications running on a processing device may unexpectedly terminate due to an error on the application platform.

The inventors have observed and/or recognized that in the event that an application unexpectedly terminates, upon restarting or rebooting the application, it may be desirable to preserve the processing device's context prior to the error so that a user is unable to detect that an error occurred. The inventors have further observed and/or recognized that events may be fired by the device function due to a user's operation of the processing device while the application is in the process of restarting. As such, events fired by the device function may fail to be received by the application. Embodiments of the present invention recognize that, due to this problem, it would be desirable to effectively deliver events fired by the device function while an application is restarting. Various embodiments of the present invention may address or improve upon some or all of the aforementioned problems or disadvantages, however it will be understood that addressing any particular problem or disadvantage is not a necessary requirement for the practice of all embodiments of the present invention.

Figure 1:
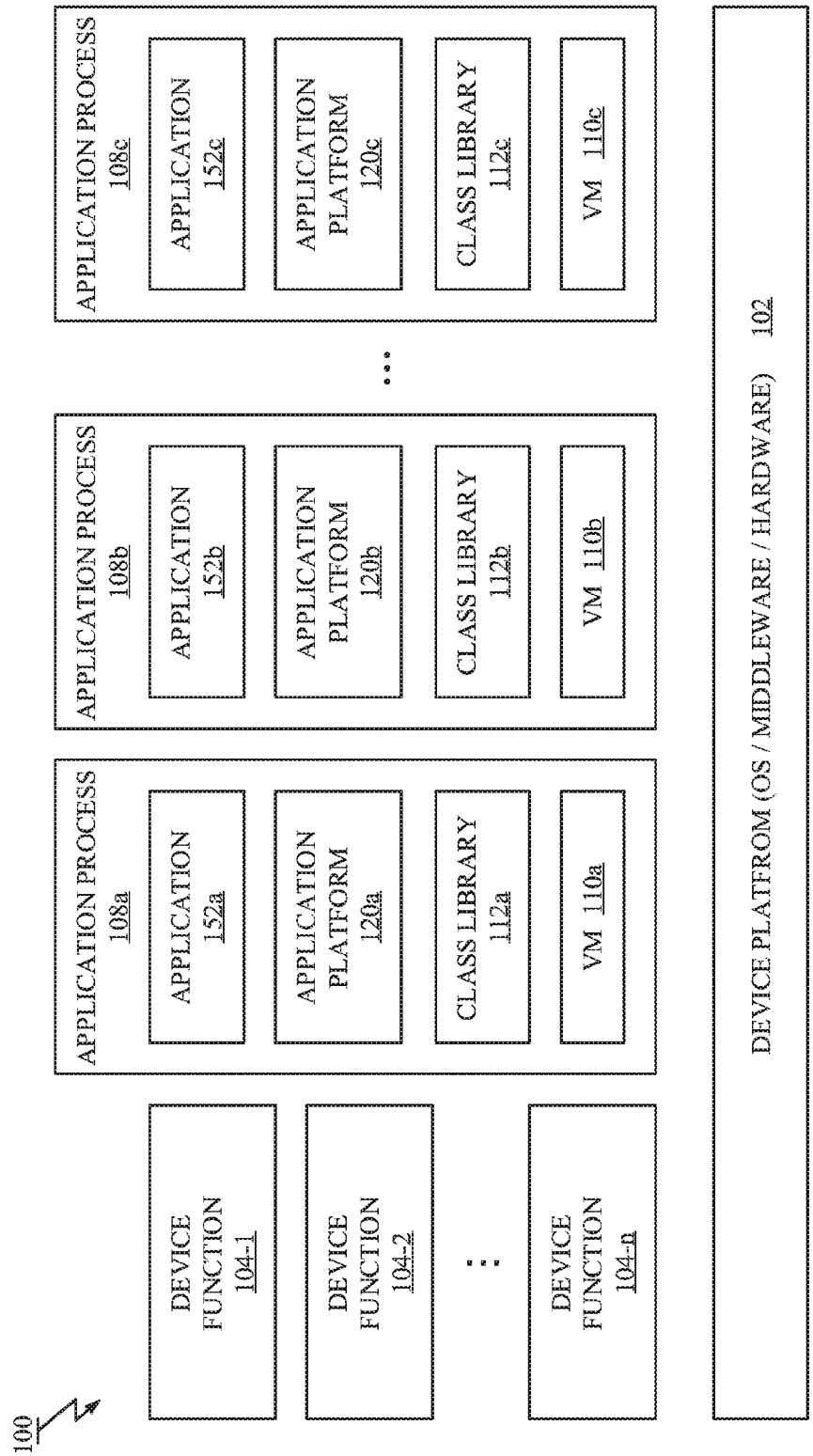
FIG. 1 depicts an overview of the architecture of an application environment in accordance with at least one embodiment of the invention.

Referring now to various embodiments of the invention in more detail, FIG. 1 is an overview of an application environment running on processing device 100. Processing device 100 may be any electronic device, including, but not limited to in-vehicle devices (e.g., vehicle navigation system, vehicle entertainment system, etc.), mobile devices (mobile phone, laptop, tablet, smartwatch, etc.), desktop computers, etc. Processing device 100 may include a device platform 102, one or more device functions 104, a virtual machine ("VM") 110, a class library 112, an application platform 120 and an application 152.

Device platform 102 may include hardware, an operating system and middleware. The hardware may include a processor, a memory, a storage device, a network adaptor, a vehicle navigation system, an audio system, etc. depending on the purpose of processing device 100. The operating system (e.g., Android™, iOS, UNIX™, Mac OS®, Windows®, Linux®, etc.) may be system software that manages the hardware and software resources in processing device 100. The middleware may be software that provides functions commonly used by the software components of the operating system.

Device function 104 may provide a function available to application 152, which may be provided by software components separate from application platform 120 and application 152. For example, device function 104 may include a location marking function provided by a map component of a vehicle navigation system to place icons on a map. In another example, device function 104 may include an audio/video playback function provided by a media player component of an audio system.

In an embodiment of the invention, each application 152 may run in each application process 108 on device platform 102. Each application 152 is managed by the operating system of device platform 102. Furthermore, VM 110, class library 112, application platform 120 and application 152 may be executed in each application process 108.

VM 110 may provide a platform-independent program execution environment. VM 110 may be any generally known virtual machines, such as Java™ virtual machine ("JVM"). Class library 112 may be a set of libraries which applications 152 and application platform 120 may access during runtime. Class library 112 may be any generally known standard or extended libraries (e.g., Java™ Class Library, including Java™ Abstract Window Toolkit ("AWT"), Swing packages, etc.) corresponding to VM 110.

Application platform 120 may provide a software environment used to run application 152. In embodiments of the invention, application platform 120 may be a software platform, wherein the term "application platform" and "software platform" may be used interchangeably. Application platform 120 may manage the lifecycle of application 152, including starting and stopping application 152, as well as detecting a failure of application 152. Application platform 120 may also provide device functions 104 to application 152 through application programming interfaces ("APIs"). In embodiments of the invention, application platform 120 is a software platform.

Application 152 may be software hosted by application platform 120. Application 152 may be any generally known applications, including, but not limited to applications running on a vehicle navigation system, media player, etc. For example, in the case of a Java virtual machine, application 152 may be a Java™ based application. In embodiments of the invention, application 152 may be a software unit, wherein the terms "application" and "software unit" may be used interchangeably. A software unit may generally be understood as one or more code instructions at any level of abstraction.

Figure 2:
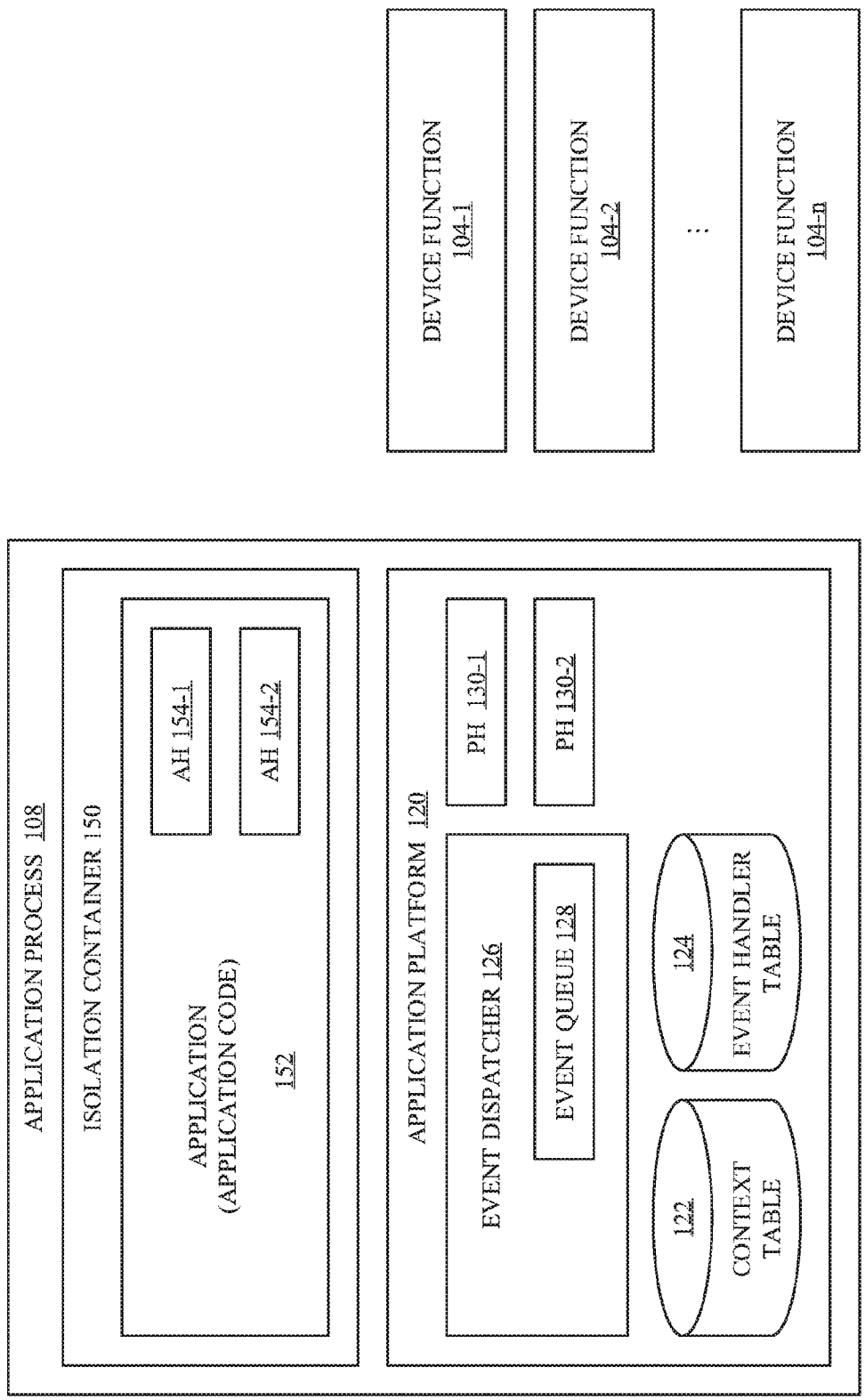
FIG. 2 depicts a schematic of an application process with device functions of a processing device in accordance with at least one embodiment of the invention.

FIG. 2 is a schematic of application process 108. In FIG. 2, application platform 120 may run application 152 in an isolation container 150 located on application platform 120. Here, application platform 120 runs outside of isolation container 150. By running application platform 120 outside of isolation container 150, application platform 120 will not be affected by a failure of application 152 running in isolation container 150.

Isolation container 150 may include any generally known mechanisms that provide for a separate region for executing code of application 152 so as to prevent application platform 120 running outside of the region from being affected by a failure in the region. In an embodiment of the invention, isolation container 150 runs in each application process 108 and each application 152 runs in each isolation container 150.

In order to operate device function 104, an instance of device function 104 may be provided to application 152. Upon receiving a request from application 152, application platform 120 may allocate an instance of device function 104 instantiated by application platform 120 to application 152 and return an identifier for the allocated instance. Applications 152 may operate device functions 104 by callings APIs provided by application platform 120 by using the identifier of the instance as an argument. For example, application 152 may place icons on a map by calling an API.

Application platform 120 may include a context table 122. Application platform 120 may store usage data generated by device function 104 to context table 122 and associated with the identifier of the instance of device 104 during the operation of device function 104 by application 152. Context table 122 may be stored in a memory region outside of isolation container 150, thereby preventing the usage data generated by device function 104 from being lost in the event that application 152 is abnormally terminated.

The usage data may include data passed from application 152 to device function 104 via application platform 120. The usage data may also include data generated by device function 104, which may be delivered to application 152 via application platform 120. The content of the usage data depends on the particular function of device function 104. For example, with regard to a location marking function, the usage data transmitted by application 152 may include images files in the form of icons, as well as the location of the icons. In another example, the usage data transmitted by application 152 may include an audio file (e.g., nine songs)

to be played by a media player component. Upon completion of the first song, the media player may begin playing the second song, and so forth. In this case, the media player component may issue an event that includes information indicating that the media player is currently playing the second song, which can then be stored as the usage data.

When a failure of application 152 is detected, application platform 120 may restart application 152 in isolation container 150. Upon restarting application 152, application platform 120 may provide application 152 with usage context (i.e., the identifier of the instance and the usage data associated with the instance stored on context table 122). Accordingly, the usage context enables the restarted application 152 to resume at the same instance prior to the failure.

In an embodiment of the invention, application platform 120 may include an event handler table 124, an event dispatcher 126 and one or more event handlers, including a platform event handler ("PH") 130. Event dispatcher 126 may include an event queue 128 associated with event dispatcher 126. Application 152 may include one or more event handlers 154, including an application event handler ("AH") 154. In embodiments of the invention, AH 154 may be a software event handler, wherein the terms "AH" and "software event handler" may be used interchangeably. PH 130 and AH 154 may correspond to a platform event handler and an application event handler, respectively.

Figure 3:
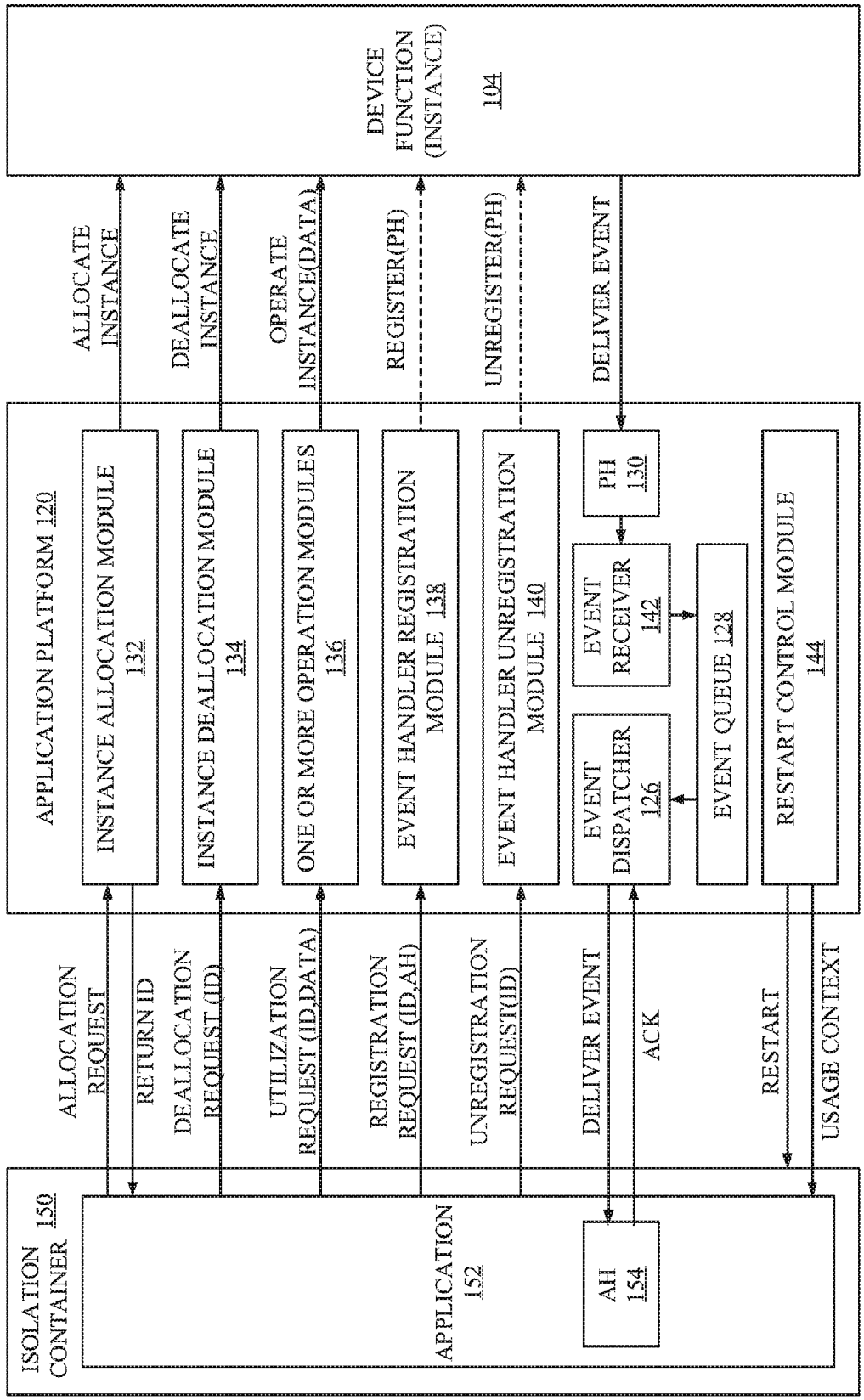
FIG. 3 is a block diagram of the interactions between an application platform, an application and a device function of a processing device in accordance with at least one embodiment of the invention.

FIG. 3 is a block diagram of the interactions between application platform 120, application 152 and device function 104. As depicted in FIG. 3, application platform 120 may include an instance allocation module 132, an instance deallocation module 134, one or more operation modules 136, an event handler registration module 138, an event handler unregistration module 140, an event receiver 142, a restart control module 144, as well as event dispatcher 126, event queue 128 and PH 130 as depicted in FIG. 2.

Instance allocation module 132 may be configured to allocate an instance of device function 104 to application 152 in response to receiving an allocation request from application 152. The allocation request may be an API call to allocate the instance of device function 104, which may be provided by application platform 120. Upon receiving the request from application 152, instance allocation module 132 may allocate an instance from device 104 and return an identifier of the instance allocated to application 152. In an embodiment of the invention, application 152 requests to allocate an instance prior to operating a desired device function 104.

Upon obtaining the instance of device function 104, application 152 may transmit the identifier as a request to the API, which in turn will access the corresponding instance of device function 104. It should be appreciated that identifying information is not limited to the identifier. In an embodiment of the invention, an API may take the object holding the identifier as the request and the API can be provided as a "method" associated with the object.

Figures 4A, 4B, 4C:
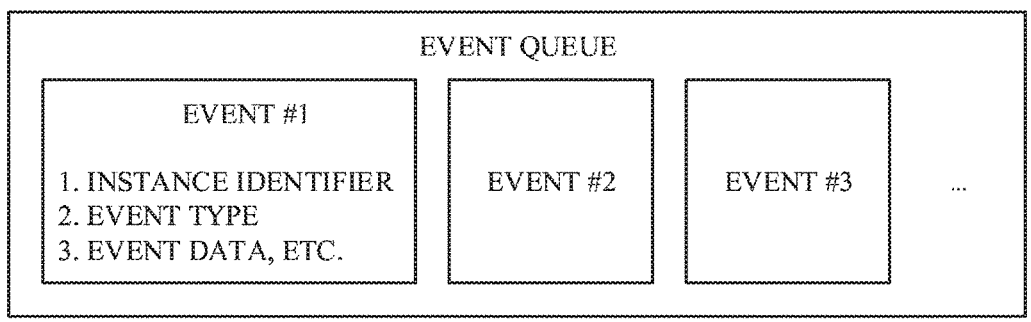
FIGS. 4A through 4C are exemplary diagrams of the data structure of a context table, event handler table and an event queue, respectively, in accordance with at least one embodiment of the invention.

In an embodiment of the invention, instance allocation module 132 may store the identifier of the allocated instance to context table 122. Referring now to FIG. 4A, an exemplary diagram of the data structure of context table 122 can be seen. In FIG. 4A, a row for each allocated instance may be created in context table 122 and the identifier of the allocated instance may be recorded for each subsequently created row.

Referring back to FIG. 3, instance deallocation module 134 may be configured to deallocate the allocated instance of device function 104 in response to receiving a deallocation request from application 152. The deallocation request may also be an API call, which may be provided by application platform 120. The request may take the identifier of the instance as an argument. Upon receiving the request from application 152, instance deallocation module 134 may deallocate the designated instance of device function 104 and delete the row where the instance was previously recorded in context table 122.

Operation module 136 may be configured to operate device function 104 in response to receiving an operation request from application 152. The operation request may also be an API call to operate the instance of device function 104 provided by application platform 120. The request may take the identifier of the instance and data passed to the instance as arguments. Upon receiving the request from application 152, operation module 136 may operate the designated instance using the data passed. Details regarding the operations and the number of operations performed by the one or more operation modules 136 may depend on the particular function of device function 104. Operation module 136 may record the usage data to the row corresponding to the designated instance in context table 122 (shown in FIG. 4A).

In an embodiment of the invention, user's operations may trigger events at the instance of device function 104. For example, an event may fire when a user clicks an icon placed by application 152 on a map component. The events fired by the instance of device 104 may be delivered to application 152. Here, application platform 120 may relay delivery of the events between the instance of device 104 and application 152. In this embodiment, application platform 120 may register PH 130 with the instance of device function 104. For example, PH 130 may include the destination of the message queue and/or socket for inter-process communication. The events fired by the instance of device function 104 may first be delivered to PH 130 of application platform 120. In an alternative embodiment, application platform 120 may register PH 130 with the instance of device function 104 each time it is needed.

Application 152 may receive the events fired by the instance of device function 104 via application platform 120. Here, AH 154 may include a pointer of an event listener object and/or an event handling function. In order to receive events, application 152 may request application platform 120 to register AH 154 associated with the designated instance of device function 104. Event handler registration module 138 may be configured to AH 154 associated with the instance of device function 104 in response to receiving a registration request from application 152. The registration request may also be an API call provided by application platform 120. The request may take the identifier of the instance and the AH 154 to be registered arguments.

Upon receiving the request from application 152, event handler registration module 138 may store AH 154 to event handler table 124 associated with the identifier of the instance of device function 104. Event handler table 124 may be stored in a memory region separate from isolation container 150. Referring now to FIG. 4B, an exemplary diagram of the data structure of event handler table 124 can be seen. In FIG. 4B, a row for the registered instance (i.e., the instance that application 152 has registered its AH 154 with) may be created in event handler table 124. The identifier of the instance and AH 154 passed from application 152 may be recorded to the row created in event handler table 124.

Referring back to FIG. 3, event handler unregistration module 140 may be configured to unregister AH 154 in response to receiving an unregistration request from application 152. The unregistration request may also be an API call provided by application platform 120. The request may take the identifier of the instance to be unregistered as arguments. Upon receiving the request from application 152, event handler unregistration module 140 may delete the row for the designated instance from event handler table 124.

In an embodiment of the invention, PH 130 may always be registered. In an alternative embodiment, in which application platform 120 may register PH 130 each time it is needed, event handler registration module 138 and event handler unregistration module 140 may register and unregister PH 130 with the instance of device function 104 in response to receiving the request from application 152, respectively (indicated by the dashed arrows in FIG. 3).

The events fired at the instance of device function 104 may be delivered to application 152 through PH 130, event receiver 142, event queue 128, event dispatcher 126 and AH 154. Upon firing of an event, event receiver 142 may receive the event delivered from the instance of device function 104 through PH 130. For example, when application platform 120 has a PH 130 registered with the instance of the map component, an event fired by the instance of the map component subsequent to a user clicking an icon on a map would be delivered to PH 130. Upon receiving the event, event receiver 142 may store the event in event queue 128. Event queue 128 may be stored in a memory region logically external to isolation container 150, thereby preventing the events from being lost if an application is unexpectedly terminated. In an embodiment of the invention, the events from multiple instances of device functions 104 may be stored in a single event queue 128 in order to preserve the order of the events across multiple instances. In an alternative embodiment, events from each instance of device function 104 may be stored in a dedicated queue if the order of the events across the multiple instances is not important. It should be appreciated that event receiver 142 may receive the events through PH 130 even during the course of an application restarting.

Referring now to FIG. 4C, an exemplary diagram of the data structure of event queue 128 can be seen. In FIG. 4C, each event may include the identifier of the instance that fired the event, as well as the event data generated by the instance of device function 104. Application platform 120 and application 152 may distinguish the instance that has fired the received event by referring to the identifier associated with the event. If necessary, event receiver 142 may store the event data as the usage data of device function 104 to context table 122. Additionally, the event may also include the type of event. For example, event receiver 142 may determine whether the event data should be stored based on the type of event included in the event.

Referring back to FIG. 3, event dispatcher 126 may be configured to dispatch the events to AH 154 corresponding to the instance that fired the event. For example, event dispatcher 126 and event queue 128 may be an event dispatcher and event queue from Java™ AWT. In an embodiment of the invention, events may not be dispatched to application 152 and may be discarded if application 152 does not register its AH 154 for the instance of device function 104 that fired the event.

Event dispatcher 126 may be executed on a dedicated thread, wherein event dispatcher 126 may serially dequeue and dispatch events from event queue 128 associated with event dispatcher 126. Examples of such a thread include a Java™ AWT event dispatch thread and an Android™ user interface ("UI") thread. After dispatching the event to AH 154, the thread of event dispatcher may wait for a return from AH 154 before releasing the next event. A failure to receive a return from AH 154 may indicate a failure of application 152.

If application 152 is subjected to a failure, the thread of event dispatcher 126 along with application 152 may be terminated. Since the thread of event dispatcher 126 has been terminated, the events in event queue 128 may not be released after the failure. Accordingly, a new thread of event dispatcher 126 may be generated in response to restarting application 152. Here, application 152 may be launched into an entry state by transmitting the entry state to application 152 as an argument, wherein the argument denotes that the event delivered from the instance allocated prior to the failure is no longer available. In other words, the thread of event dispatcher 126 may dispatch the events continuously while application 152 runs normally.

Restart control module 144 may be configured to restart application 152 in response to detecting a failure of application 152. Restart control module 144 may simply restart isolation container 150, where application 152 was previously running. Application 152 may be restarted in isolation container 150 while maintaining application process 108 prior to the failure. In an embodiment, restart control module 144 may restart application 152 together with the instance of isolation container 150. In an alternative embodiment, restart control module 144 may only restart application 152 while maintaining the instance of isolation container 150 prior to the failure. In an embodiment, the failure of application 152 may be identified by detecting an exception error that occurred during the execution of the code of application 152. In an alternative embodiment, the failure of application 152 may be identified by detecting a lack of a response from application 152 using a watch dog timer ("WDT").

Restart control module 144 may further be configured to provide the restarted application 152 with usage context (i.e., the identifier of the instance the usage data of the instance stored on context table 122). The usage context may be provided to application 152 through a callback method or function provided by application 152. Restart control module 144 may give the usage context to an entry point of application 152 as an argument to signal that application 152 is ready to resume with the instance of device function 104 allocated before the failure. With the usage context, application 152 may recognize what device function 104 application 152 used and what the operations performed by application 152 prior to the failure. For example, where application 152 is configured to request the instance of a media player component to play an audio file or stream data, application 152 may resume with the instance of device function 104 seamlessly by using the usage context to continue playing the audio without any interruption. Here, application 152 may simply request the instance for the current playback position of the audio file prior to the failure of application 152.

As previously described above, the events may be fired by device function 104 even during the course of a restart of application 152. The event fired during the course of the restart may be released from event queue 128, but a copy of the event may continue to remain stored in event queue after the restart. Upon restarting application 152, the events that are released from event queue 128, but not delivered to application 152, may be dispatched by a new thread from event dispatcher 126 to application 152.

In an embodiment of the invention, dispatching of the events may be delayed until a new AH 154 for the instance registered before the failure is registered by application 152 with application platform 120 based on the usage context after the restart. The usage context may include information indicating the instance registered by application 152 before the failure. The information included in the usage context may be a flag (hereinafter, "event handler flag") indicating whether application 152 has the event handler registered for the instance of device function 104.

In an embodiment of the invention, dispatching may be delayed until one or more new AH's 154 for all instances registered before the failure are registered by application 152 with application platform 120 after the restart. Here, application 152 may request to register new AH's 154 for all instances of device function 104, which may be specified by the event handler flag in the usage context, according to a certain time period from the restart, in order to receive the event fired during the course of the restart. By having application 152 register AH's 154 after the restart, continuity of operations may be preserved since the order of events fired during the course of the restart and operations requested after the restart are preserved. Alternatively, in order to preserve the continuity of operations, operation module 136 may reject the operation request and return an error until AH's 154 are registered for all instances of device function 104 after the restart.

In embodiments of the present invention, each of modules 122 through 144 of application platform 120 and application 152 described in FIG. 3 may be implemented as a software module, including program instruction and/or data structures in conjunction with hardware component, such as a processor, memory, etc.

Figure 5:
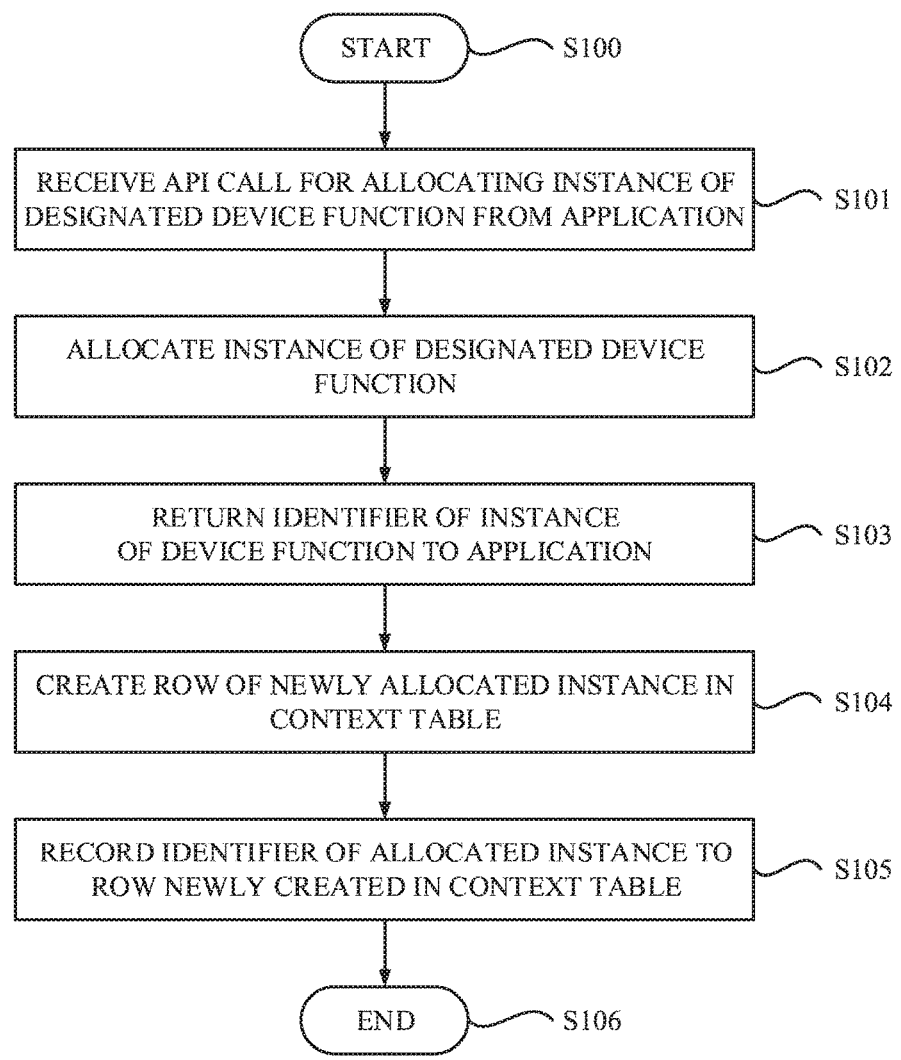
FIG. 5 is a flowchart diagram depicting operational steps for allocating an instance of a device function to an application in accordance with at least one embodiment of the invention.

FIG. 5 is a flowchart diagram depicting operational steps for allocating an instance of a device function to an application in accordance with at least one embodiment of the invention. As depicted in FIG. 5, the process may start at step S100 in response to an allocation request from application 152. In an embodiment of the invention, the process illustrated by FIG. 5 may be performed by a processor implementing the instance allocation module 132 of application platform 120.

At step S101, instance allocation module 132 may receive an API call for allocating an instance of a designated device function 104 from application 152. At step S102, instance allocation module 132 may allocate an instance of the designated device function 104 to application 152. In an embodiment of the invention, instance allocation module 132 may request device function 104 to allocate the instance through an API call provided by the software component of device function 104. At step S103, instance allocation module 132 may return the identifier of the allocated instance of device function 104 to application 152. At step A104, instance allocation module 132 may create a row for the newly allocated instance in context table 122. At step S105, instance allocation module 132 may record the identifier of the newly allocated instance in the row created in context table 122. At step S106, the process is ended.

Figure 6:
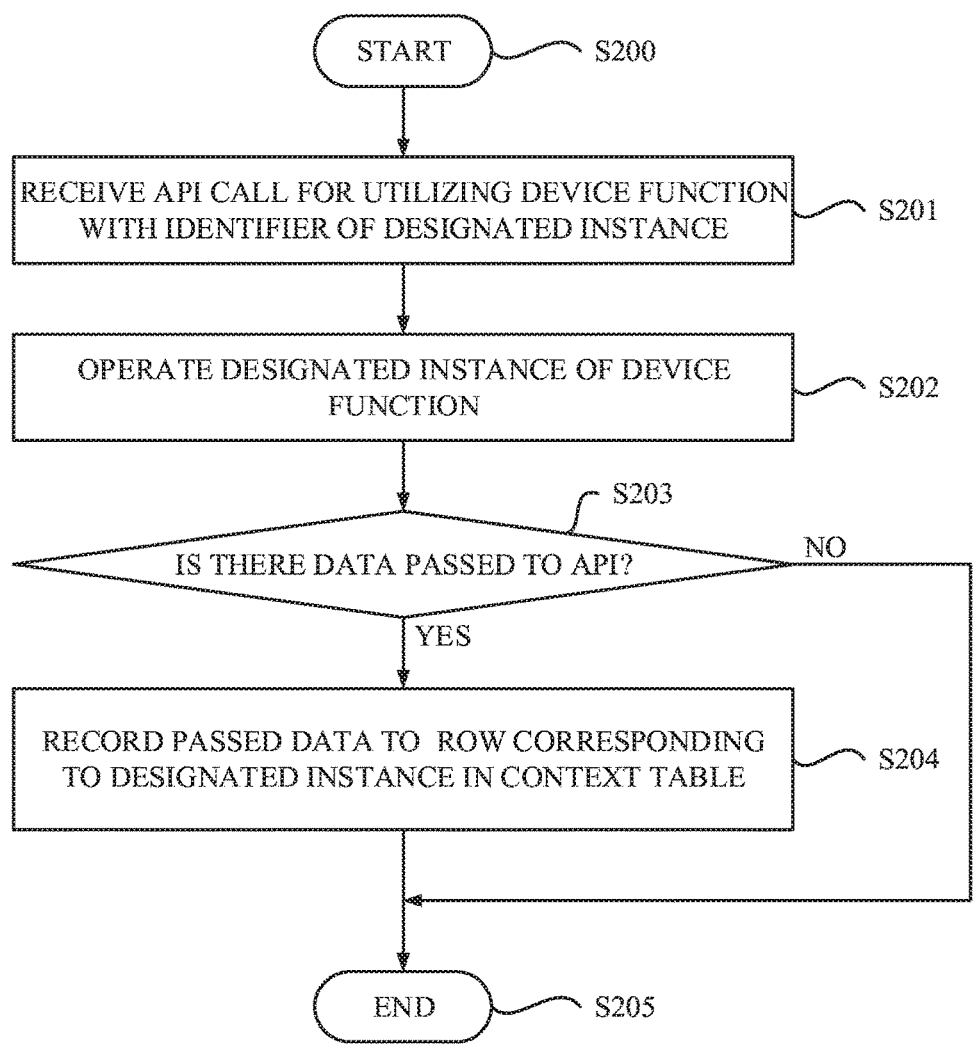
FIG. 6 is a flowchart diagram depicting operational steps for operating an instance of a device function in accordance with at least one embodiment of the invention.

FIG. 6 is a flowchart diagram depicting operational steps for operating an instance of a device function in accordance with at least one embodiment of the invention. The process illustrated in may be executed in response to each operation request from application 152 while application 152 runs on processing device 100 using the allocated instance of device function 104. As depicted in FIG. 6, the process may start at step S200 in response to the operation request from application 152. In an embodiment of the invention, the process illustrated by FIG. 6 may be performed by the processor implementing operation module 136 of application platform 120.

At step S201, operation module 136 may receive an API call for operating the device function with the identifier of the designated instance from application 152. At step S202, operation module 136 may operate the designated instance of device function 104. At step S203, operation module 136 may determine whether data has been passed to the API from application 152. If operation module 136 determines that data has passed to the API (YES), the process may branch to step S204. At step S204, operation module 136 may record the passed data to the row corresponding to the designated instance of device function 104 on context table 122 and end the process at step S205. On the other hand, if operation module 136 determines that data has not passed to the API (NO), the process may proceed directly to step S205 where the process is ended.

Figure 7:
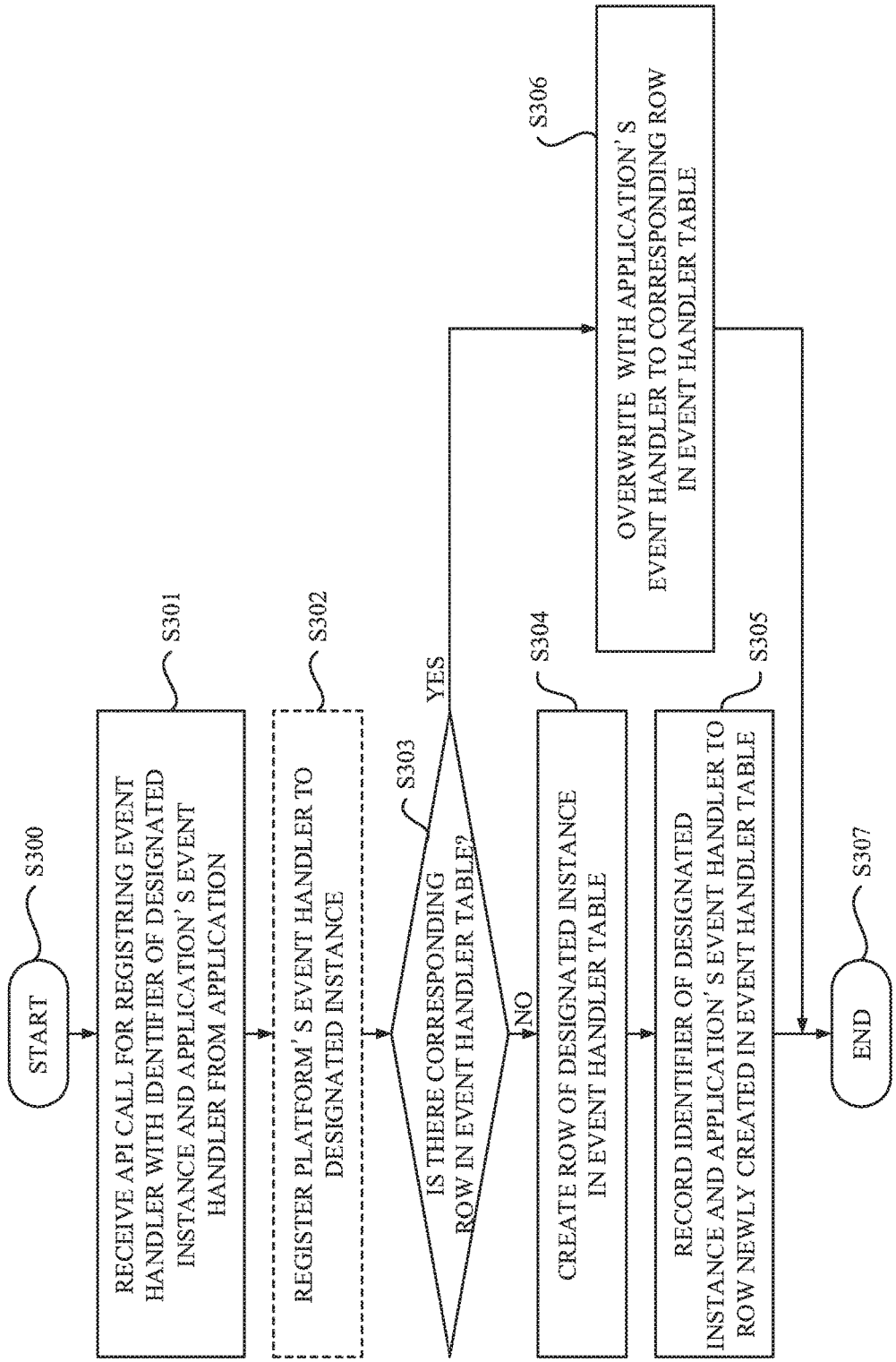
FIG. 7 is a flowchart diagram depicting operational steps for registering an event handler for an instance of a device function in accordance with at least one embodiment of the invention.

FIG. 7 is a flowchart diagram depicting operational steps for registering an event handler for an instance of a device function in accordance with at least one embodiment of the invention. As depicted in FIG. 7, the process may start at step S300 in response to the registration request from application 152. In an embodiment of the invention, the process illustrated by FIG. 7 may be performed by the processor implementing event handler registration module 138 of application platform 120.

At step S301, event handler registration module 138 may receive an API call for registering the event handler with the identifier of the designated instance of device function 104 and AH 154 from application 152. At step S302, event handler registration module 138 may register PH 130 with the designated instance of device function 104. In an embodiment of the invention, step S302 may optionally be performed where application platform 120 is configured to register the PH 130 with the instance of device function 104 each time it is needed. At step S303, event handler registration module 138 may determine whether there is a row corresponding to the designated instance in event handler table 124. If event handler registration module 138 determines that no row corresponds to the designated instance in event handler table 124 at step S303 (NO), the process may branch to step S304. At step S304, event handler registration module 138 may create a row for the designated instance in event handler table 124. At step S305, event handler registration module 138 may record the identifier of the designated instance of device function 104 and AH 154 to the row created in event handler table 124. The process is ended at step S307.

However, if event handler registration module 138 determines that there is a corresponding row in event handler table 124 at step S303 (YES), the process may branch to step S306. At step S306, event handler registration module 138 may overwrite a new AH 154 passed from application 152 to the corresponding row in event handler table 124 and end the process at step S307. If application 152 registers AH 154 for the instance of device function 104 prior to a failure, the event handler field of the row corresponding to the instance in event handler table 124 may be set to "NULL" when restarting application 152. The "NULL" value may be overwritten with the new AH 154.

Figure 8:
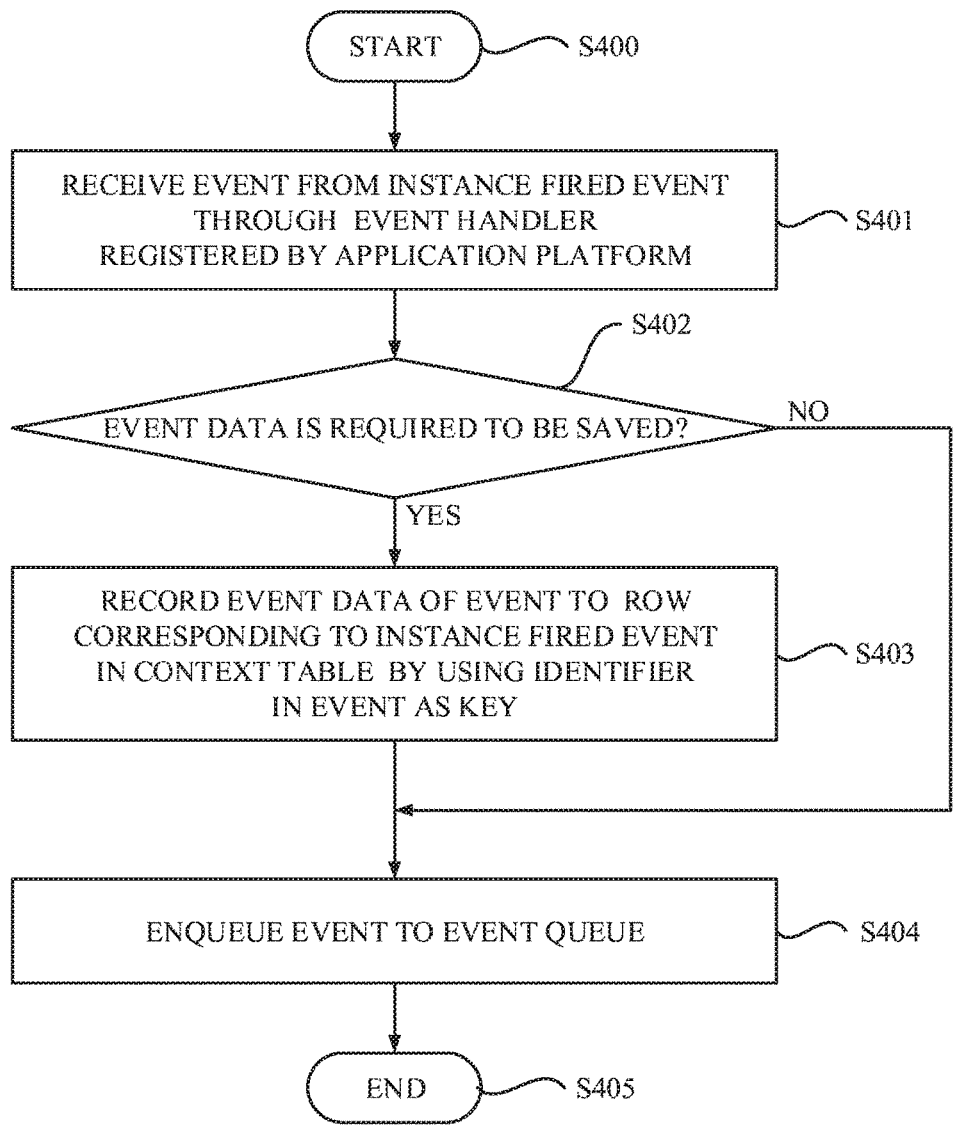
FIG. 8 is a flowchart diagram depicting operational steps for queuing an event received from an instance of a device function into an event queue in accordance with at least one embodiment of the invention.

FIG. 8 is a flowchart diagram depicting operational steps for queuing an event received from an instance of a device function into an event queue in accordance with at least one embodiment of the invention. As depicted in FIG. 8, the process may start at step S400 in response to the event delivered from the instance of device function 104. In an embodiment of the invention, the process illustrated by FIG. 8 may be performed by the processor implementing event receiver 142 of application platform 120.

At step S401, event receiver 142 may receive an event from the instance of device function 104 that fired an event through a PH 130 registered by the application platform 120. The event may include the identifier of the instance that fired the event, event data generated by the instance of device function 104, and the type of event.

At step S402, event receiver 142 may determine whether the event data should be stored. For example, the determination may be made based on the type of event included in the event. In an embodiment of the invention, the types of events to be stored depends on the function of device function 104. For example, an event indicating a change from a first song to a second song may be stored as usage data. In an alternative embodiment, the types of event to be stored may be predetermined. If event receiver 142 determines that the event data should be stored in step S402 (YES), the process may branch to step S403. At step S403, event receiver 142 may record the event data included in the event to the row corresponding to the instance that fired the event in context table 122 by using the identifier in the event as a key. For example, if a song change event of the media player component is delivered, information about the song may be recorded.

However, if event receiver 142 determines that the event data should not be stored in step S402 (NO), the process may proceed directly to step S404. At step S404, event receiver 142 may release the event from event queue 128 and end the process at step S405.

Figure 9:
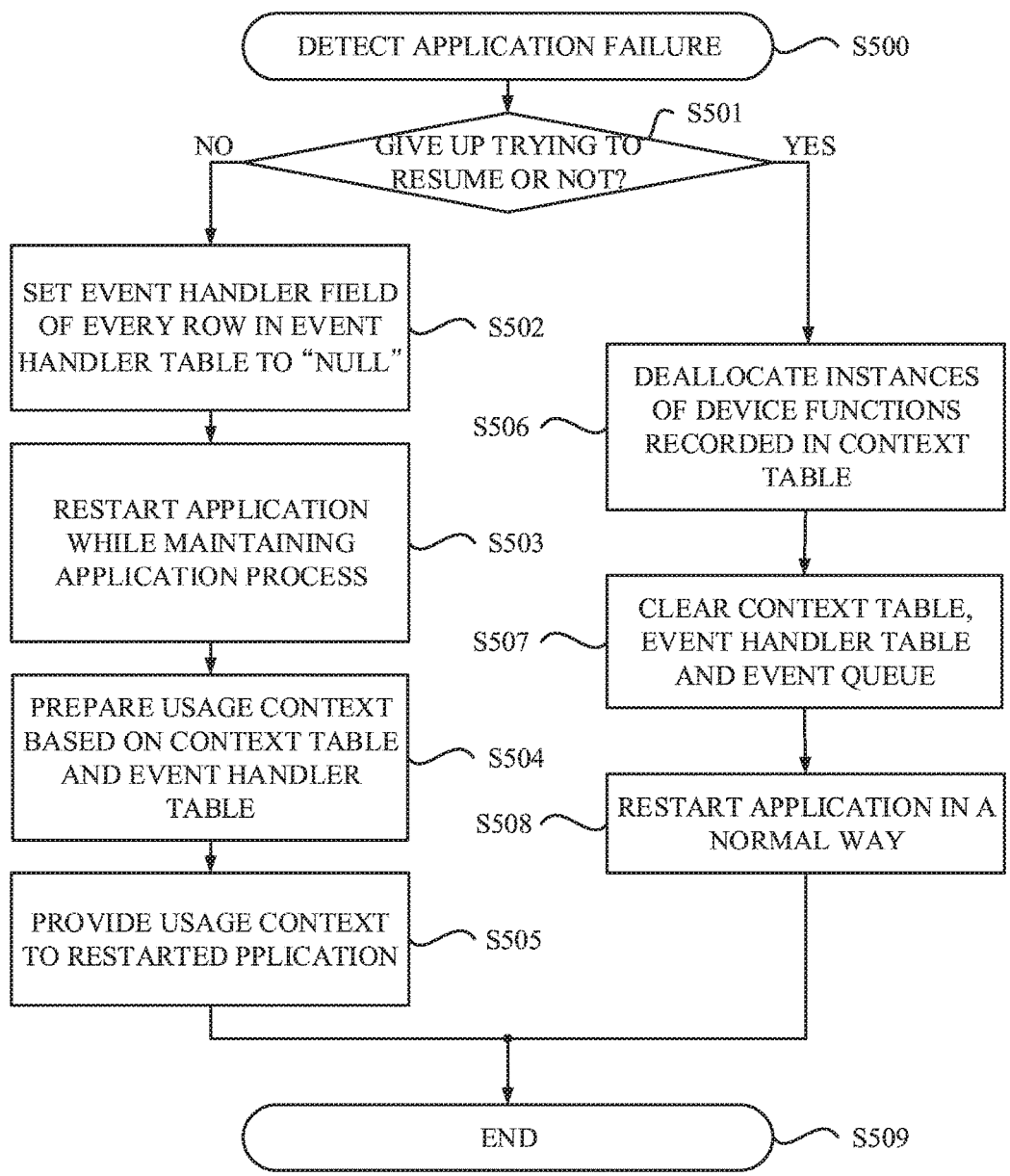
FIG. 9 is a flowchart diagram depicting operational steps for restarting an application in response to detecting an application failure in accordance with at least one embodiment of the invention.

FIG. 9 is a flowchart diagram depicting operational steps for restarting an application in response to detecting an application failure in accordance with at least one embodiment of the invention. As depicted in FIG. 9, the process may start at step S500 in response to detecting an application failure. In an embodiment of the invention, the process illustrated by FIG. 9 may be performed by the processor implementing restart control module 144 of application platform 120.

At step S501, restart control module 144 may identify a condition, the condition denoting that restarting application 152 based on the usage context should be terminated. If restart control module 144 determines that the condition does not exist at step S501 (NO), the process may branch to step S502. Upon initially restarting the application 152, the process may branch to the step S502.

At step S502, restart control module 144 may set the event handler field to "NULL" for each row in event handler table 124. At step S503, restart control module 144 may restart application 152 by restarting isolation container 150 while maintaining application process 108.

At step S504, restart control module 144 may prepare the usage context based on information from context table 122 and event handler table 124. The prepared usage context may include the identifier, the usage data and the event handler flag for each allocated instance of device functions 104. Here, the event handler flag may be true if the row of the corresponding instance exists in event handler table 124 (i.e., AH 154 for the corresponding instance has been registered by application 152 prior to the failure). On the other hand, the event handler flag may be false if the row of the corresponding instance does not exist in event handler table 124.

At step S505, restart control module 144 may provide the prepared usage context to the restarted application 152 and end the process at step S509. Restart control module 144 may give the usage context to an entry point of application 152 as an argument to signal that application 152 is ready for resuming with the instance of device function 104 allocated before the failure.

However, if restart control module 144 identifies the condition at step S501 (YES), the process may branch to step S506. The condition may be defined by any generally known rules regarding the restart. For example, the condition may be defined so that restart control module 144 ends its attempt to resume application 152 using the usage context if application 152 restarts for a second time within a given time period from the first restart. In another example, the condition may be defined so that restart control module 144 ends its attempt to resume application 152 using the usage context if application 152 repeats a predetermined number of times within a given time period.

At step S506, responsive to the condition being satisfied, restart control module 144 may deallocate all instances of device functions 104 recorded in context table 122. At step S507, restart control module 144 may clear context table 122, event handler table 124, and event queue 128. At step S508, restart control module 144 may restart application 152 by launching application 152 in a normal way and the process may end at step S509. In an embodiment, restart control module 144 may give a flag to an entry point of application 152 as an argument to signal that the instance allocated before the failure is no longer available. In an alternative embodiment, restart control module 144 may launch application 152 into an entry state by transmitting the entry state to application 152 as an argument, the argument denoting that the instance allocated prior to the failure is no longer available.

Figure 10:
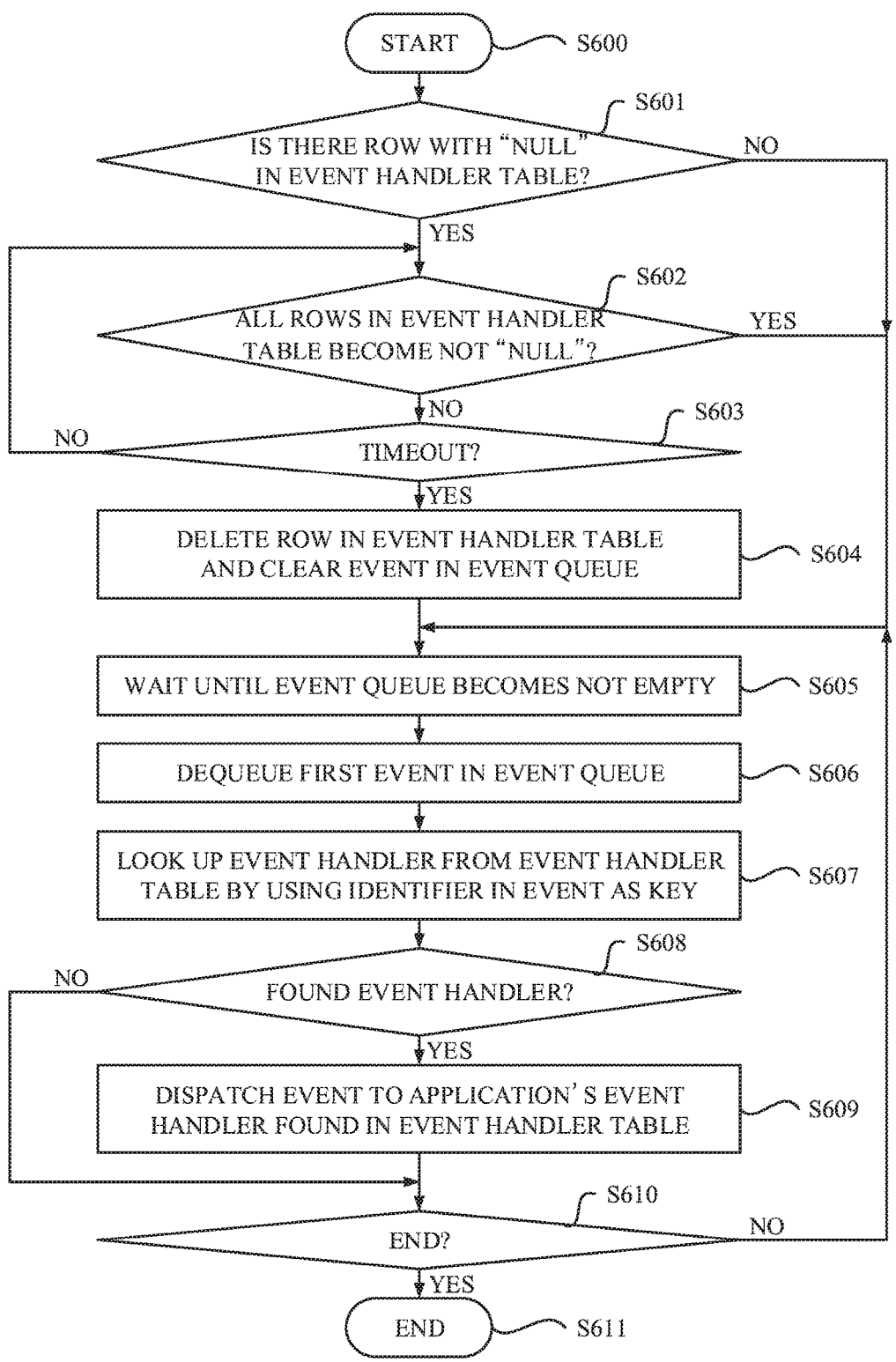
FIG. 10 is a flowchart diagram depicting operational steps for dequeuing and dispatching an event from the event queue in accordance with at least one embodiment of the invention.

FIG. 10 is a flowchart diagram depicting operational steps for dequeuing and dispatching an event from the event queue in accordance with at least one embodiment of the invention. As depicted in FIG. 10, the process may start at step S600 in response to the creation of a thread by event dispatcher. In an embodiment of the invention, the process illustrated by FIG. 10 may be performed by the processor executing the thread of event dispatcher 126 of application platform 120.

At step S601, the thread of event dispatcher 126 may determine whether a row exists in event handler table 124 with a "NULL" value. If event handler table 124 includes a row having the event handler field "NULL", then it may be determined that application 152 has registered at least one AH 154 for the instance of device function 104 before the failure, but has yet to finish registering an AH 154 for the instance after the restart.

If the thread of event dispatcher 126 determines that there is at least one row with a "NULL" value in event handler table 124 at step S601 (YES), then the process may branch to step S602. At step S602, the thread of event dispatcher 126 may further determine whether all of the rows in event handler table 124 have a "NULL" value.

If the thread of event dispatcher 126 determines that all of the rows in event handler table 124 do not have a "NULL" value at step S602 (NO), then the process may branch to step S603. At step S603, the thread of event dispatcher 126 may further identify a timeout, the timeout corresponding to a period of time for application 152 to register a new AH 154 for each instance registered before the failure. In an embodiment of the invention, the length of the timeout may be predetermined.

If the thread of event dispatcher 126 does not identify a timeout at step S603 (NO), the process may loop back to step S602. On the other hand, if the thread of event dispatcher 126 identifies a timeout at step S603 (YES), the process may branch to step S604. At step S604, responsive to the timeout passing, the thread of event dispatcher 126 may delete all of the rows in event handler table 124, as well as clear all of the events in event queue 128. In an embodiment of the invention, an AH 154 for at least one instance registered before the failure may be deleted. Furthermore, at least one event associated with the at least one instance deleted may be cleared. However, an AH154 for at least one instance registered after the restart is preserved. The process may proceed to step S605 for normal operation.

If the thread of the event dispatcher 126 determines that all of the rows in event handler table 124 have a "NULL" value at step S602 (YES), then the process may branch to step S605 for the normal operation. In other words, application 152 has finished registering new event AH's 154. Likewise, if the thread of event dispatcher 126 determines that none of the rows in event handler table 124 have a "NULL" value at step S601 (NO), the process may proceed directly to step S605. In this scenario, application 152 may start in a normal way (i.e., either application 152 has not registered the AH's 154 prior to the failure or application 152 has finished registering the AH's 154 after the restart).

At step S605, the thread of event dispatcher 126 may wait until event queue 128 is filled. At step S606, the thread of event dispatcher 126 may dequeue the first event in event queue 128. At step S607, the thread of event dispatcher 126 may look up the events corresponding AH 154 from event handler table 124 by using the events identifier as a key. At step S608, the thread of event dispatcher 126 may determine whether the events corresponding AH 154 has been located.

If the thread of event dispatcher 126 locates the events corresponding AH 154 at step S608, the process may branch to step S609. At step S609, the thread of event dispatcher 126 may dispatch the event to the AH 154 in event handler table 124. If the thread of event dispatcher 126 does not locate the events corresponding AH 154 at step S608, the process may proceed directly to step S610. In this scenario, the event dequeued from event queue 128 at step S606 may be deleted.

At step S610, the thread of event dispatcher 126 may determine whether the process should end. If the thread determines that the process should not end at step S610 (NO), the process may loop back to step S605 for the next event. If the thread determines that the process should end at step S610 (YES), the process may proceed to step S611 and end.

In an embodiment of the invention, the thread of event dispatcher 126 may continuously dispatch one or more events while the application 152 runs normally. However, if application 152 is subjected to a failure, the thread of event dispatcher 126 may be terminated by application platform 120 along with application 152. In an alternative embodiment, if the thread is executed in isolation container 150, the thread of event dispatcher 126 may terminate along with application 152.

Figure 11:
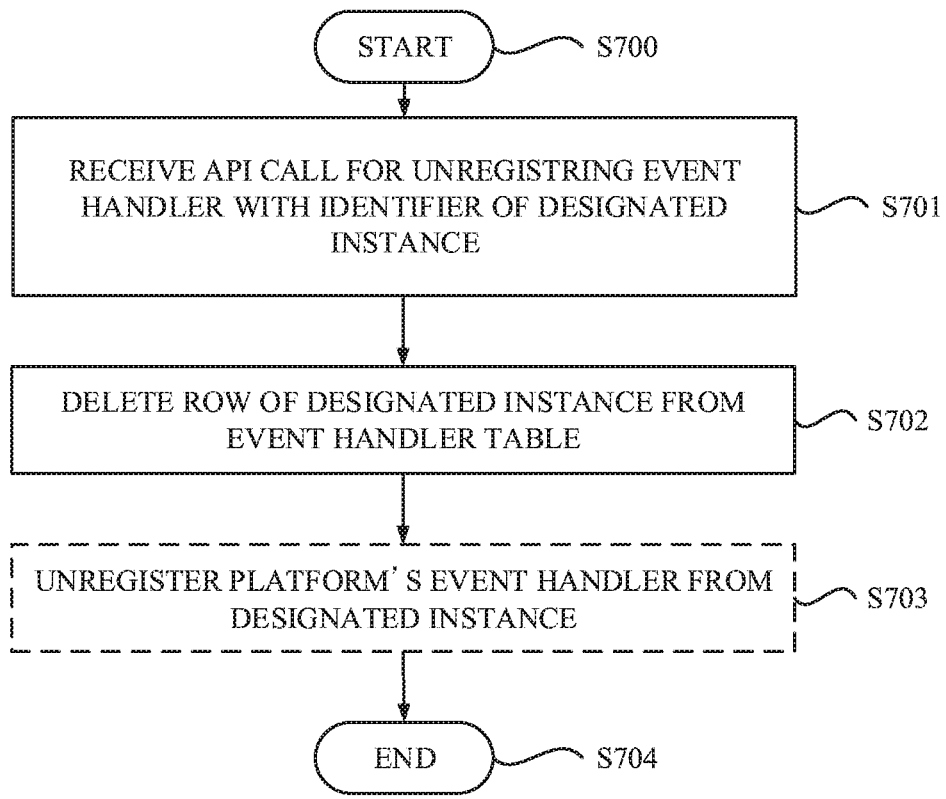
FIG. 11 is a flowchart diagram depicting operational steps for unregistering an event handler for an instance of a device function in accordance with at least one embodiment of the invention.

FIG. 11 is a flowchart diagram depicting operational steps for unregistering an event handler for an instance of a device function in accordance with at least one embodiment of the invention. As depicted in FIG. 11, the process may start at step S700 in response to the unregistration request from application 152. In an embodiment of the invention, the process illustrated by FIG. 11 may be performed by the processor implementing the event handler unregistration module 140 of application platform 120. In an embodiment of the invention, one AH 154 may be registered to one instance of device function 104. In an embodiment of the invention, one or more AH's 154 may be registered to one instance of device function 104.

At step S701, event handler unregistration module 140 may receive an API call for unregistering the AH 154 from the identifier of the designated instance of device function 104 from application 152. At step S702, event handler unregistration module 140 may delete the row of the designated instance from event handler table 124.

At step S703, event handler unregistration module 140 may unregister the PH 130 from the designated instance of device function 104. In an alternative embodiment, the processing at step S703 may be performed optionally if application platform 120 is configured to register and unregister the PH 130 with the instance of device function 104 as needed. At step S704, the process ends.

Figure 12:
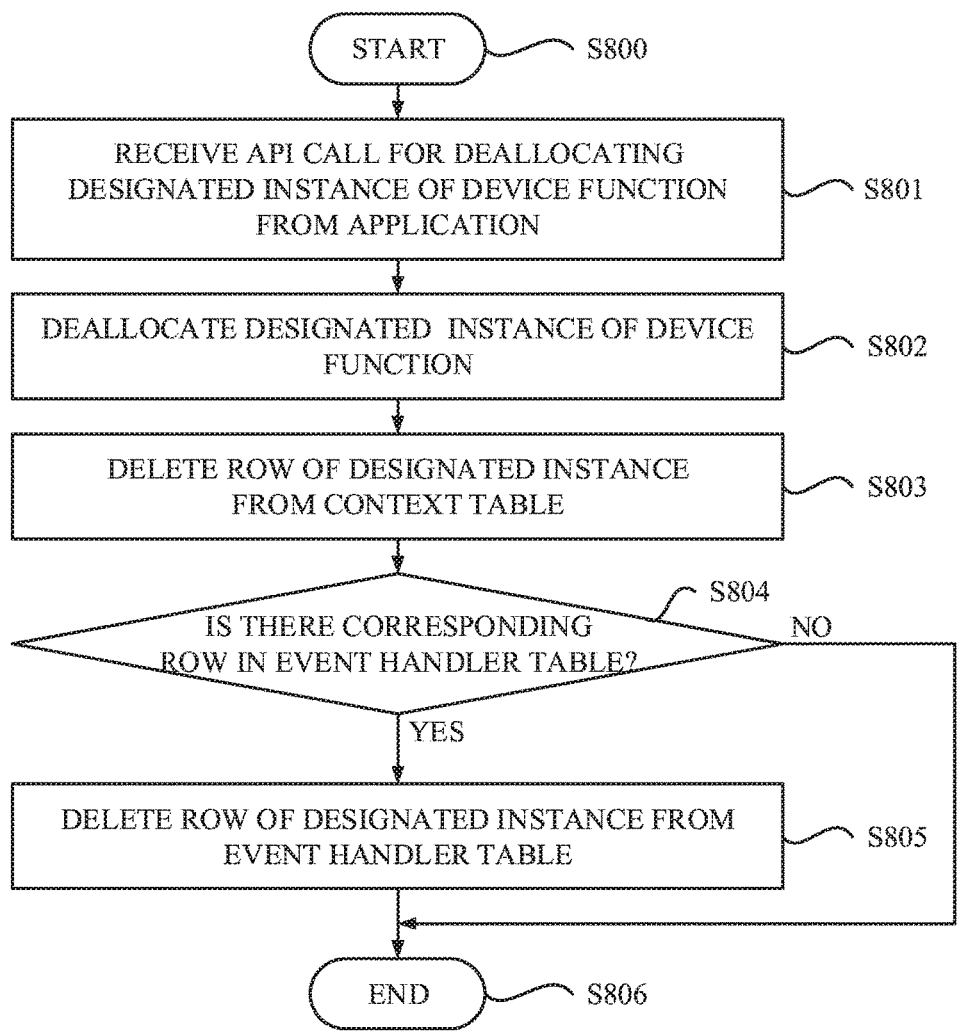
FIG. 12 is a flowchart diagram depicting operational steps for deallocating an instance of a device function in accordance with at least one embodiment of the invention.

FIG. 12 is a flowchart diagram depicting operational steps for deallocating an instance of a device function in accordance with at least one embodiment of the invention. As depicted in FIG. 12, the process may start at step S800 in response to the deallocation request from application 152. In an embodiment of the invention, the process illustrated by FIG. 12 may be performed by the processor implementing the instance deallocation module 134 of application platform 120.

At step S801, instance deallocation module 134 may receive an API call for deallocating the designated instance of the designated device function 104 from application 152. At step S802, instance deallocation module 134 may deallocate the instance of the designated device function 104. At step S803, instance deallocation module 134 may delete the row of the designated instance from context table 122. At step S804, instance deallocation module 134 may determine whether there exists a corresponding row to the designated instance in event handler table 124.

If instance deallocation module 134 determines that a corresponding row to the designated instance exists in event handler table 124 at step S804 (YES), the process may proceed to step S805. At step S805, instance deallocation module 134 may delete the row of the designated instance from event handler table 124 and end the process at step S806. However, if instance deallocation module 134 determines that a corresponding row to the designated instance does not exist in event handler table 124 at step S804 (NO), then the process may directly proceed to step S806 and end. By deleting the corresponding row from event handler table 124, the events fired by the deallocated instance may be deleted by event dispatcher 126 since no AH 154 for the event was located in event handler table 124.

Figure 13:
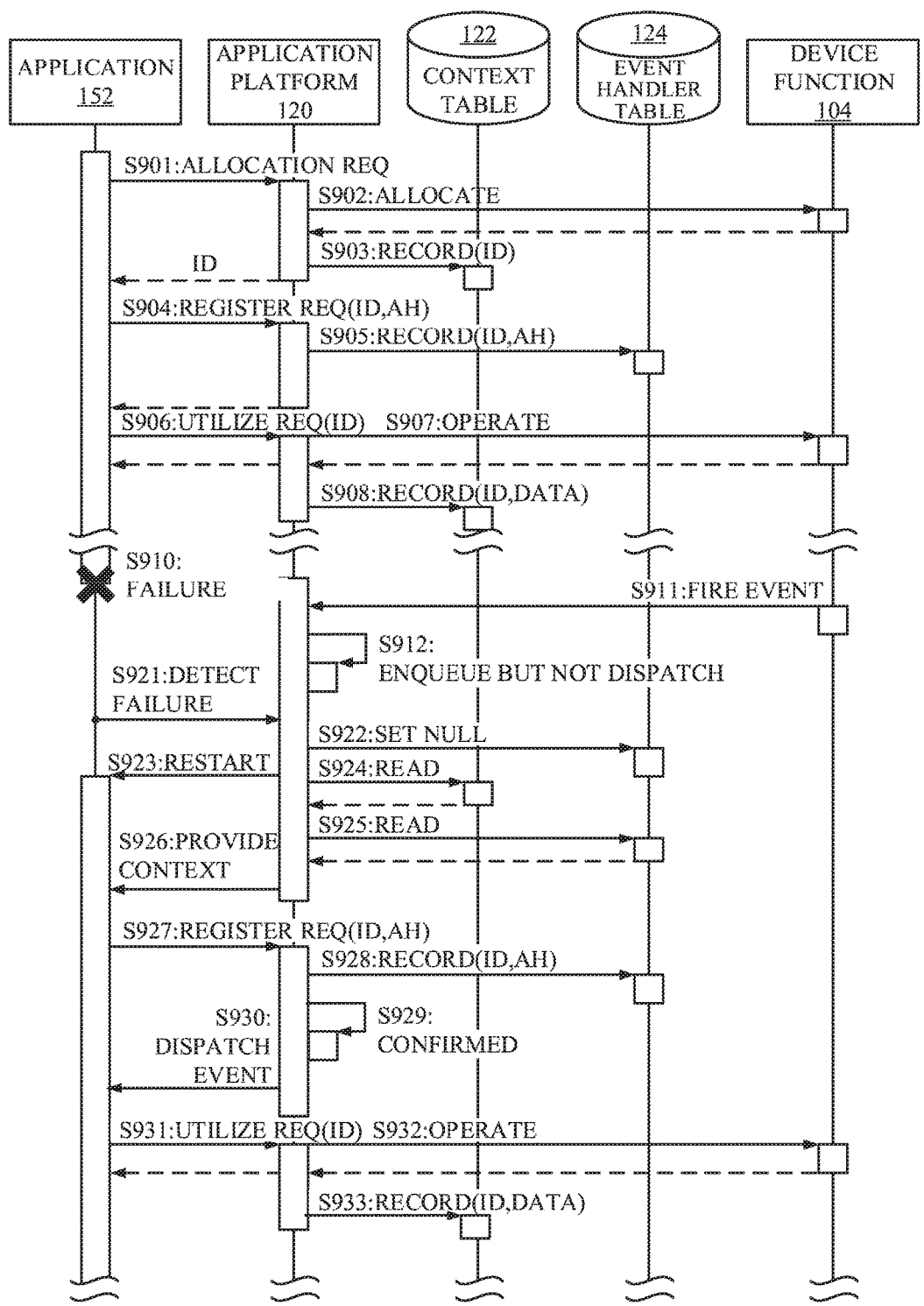
FIG. 13 is an exemplary sequence diagram illustrating the interactions between components in the course of an initial startup and subsequent restart of an application due to a failure in accordance with at least one embodiment of the invention.

FIG. 13 is an exemplary sequence diagram illustrating the interactions between components in the course of an initial startup and subsequent restart of an application due to a failure in accordance with at least one embodiment of the invention. In an embodiment of the invention, the process illustrated by FIG. 13 may be performed by the processor executing application platform 120, application 152 and device function 104. As depicted in FIG. 13, the process may start at step S901. At step S901, application 152 may request application platform 120 to allocate an instance for device function 104. At step S902, in response to receiving the request from application 152, application platform 120 may allocate an instance of device function 104. At step S903, application platform 120 may record the identifier (ID) of the allocated instance of device function 104 and return the identifier of the instance to application 152.

At step S904, application 152 may request application platform 120 to register the designated AH 154 for the designated instance of device function 104. At step S905, in response to receiving the request from application 152, application platform 120 may record the designated instance of device function 104 and the AH 154 to event handler table 124.

At step S906, application 152 may request application platform 120 operate the designated instance of device function 104. At steps S907 and S908, in response to receiving the request from application 152, application platform 120 may operate the designated instance of device function 104 (S907) and record usage data (S908).

Figure 14A:
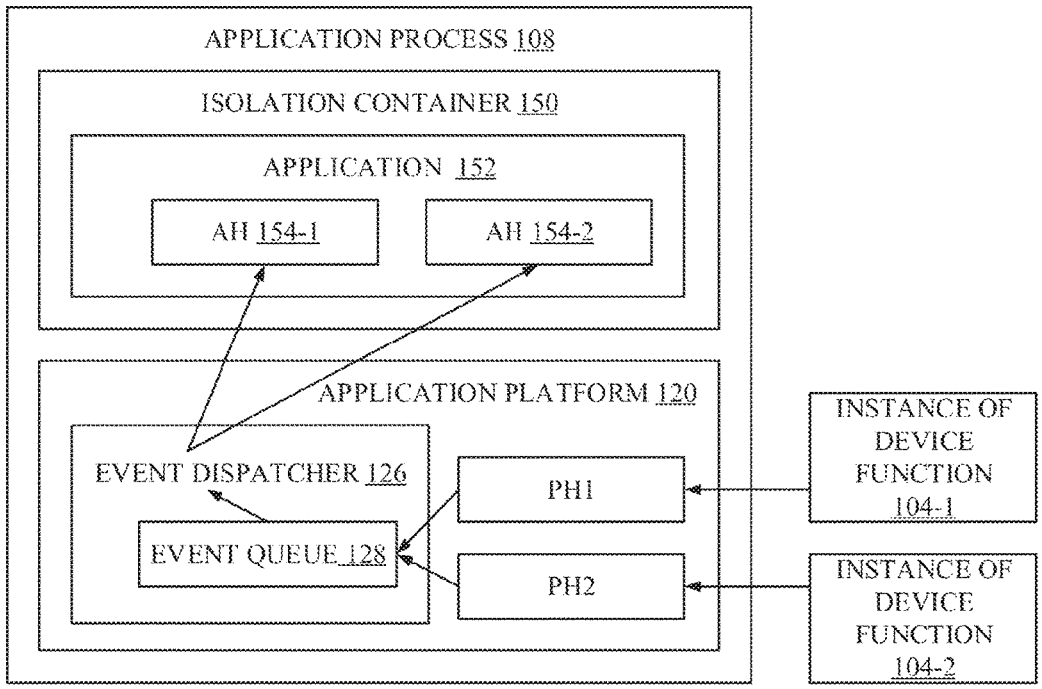
FIGS. 14A and 14B are block diagrams depicting the flow of events fired by an instance of a device function at a normal phase (FIG. 14A) and a post failure phase (FIG. 14B) in accordance with at least one embodiment of the invention.
Figure 14B:
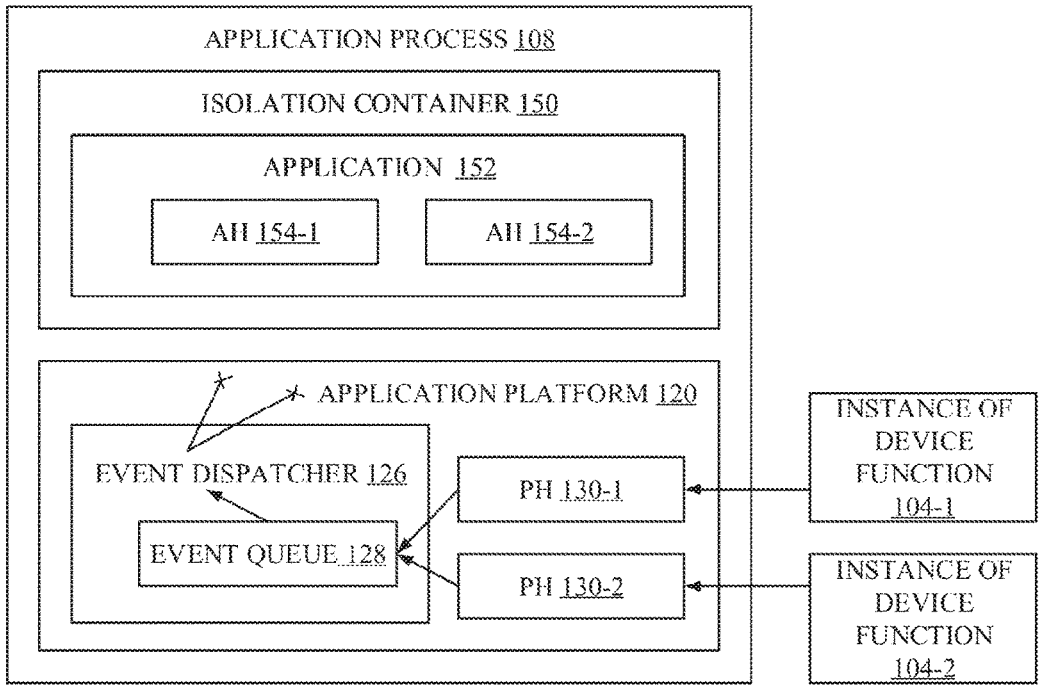

FIG. 14 is a block diagram depicting the flow of events fired by an instance of a device function at a normal phase (FIG. 14A) and a post failure phase (FIG. 14B) in accordance with at least one embodiment of the invention. As depicted in FIG. 14A, the events fired by the instance of device function 104 may be continuously delivered to application 152 via PH 130, event receiver 142, event queue 128, event dispatcher 126 and AH 154.

As depicted in FIG. 14B, upon terminating application 152, the events fired by the instance of device function 104 would stop at event queue 128 and thus the events would not be delivered to application 152. Instead, at step S911 of FIG. 13, the instance of device function 104 may fire the event and application platform 120 may enqueue the event in event queue 128, but not dispatch the event to application 152 at step S912. In this scenario, after detecting the failure of application 152 at step S921 of FIG. 13, application platform 120 may set the event handler field of event handler table 124 to "NULL" at step S922 of FIG. 13 and restart application 152 at step S923 of FIG. 13. Application platform 120 may read context table 122 and event handler table 124 at steps S924 and S925 of FIG. 13, respectively. At step S926 of FIG. 13, application platform 120 may provide the usage context based on the contents of context table 122 and event handler table 124.

Figure 15A:
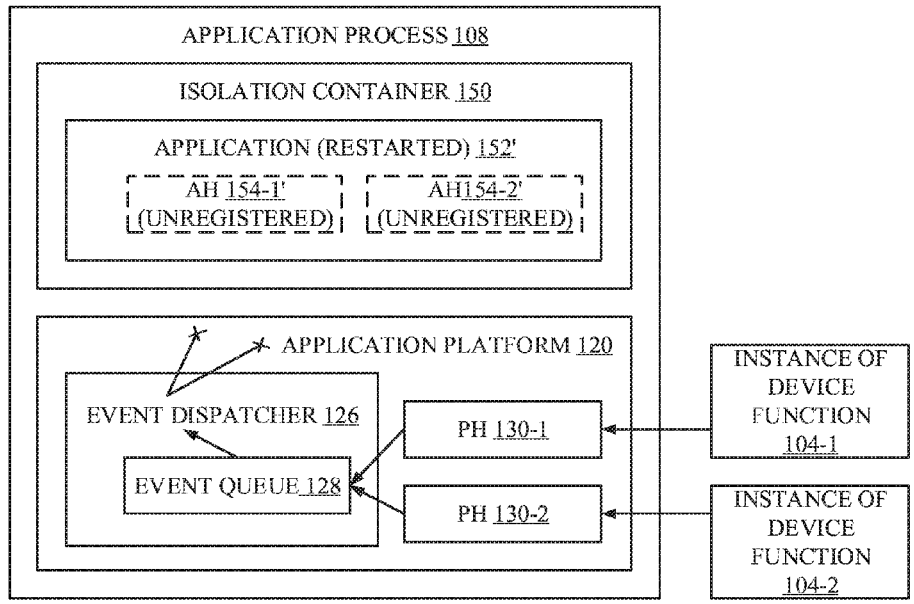
FIGS. 15A and 15B are block diagrams depicting the flow of events fired by an instance of a device function at a post restart phase (FIG. 15A) and a post registration of a new application's event handlers phase (FIG. 15B) in accordance with at least one embodiment of the invention.
Figure 15B:
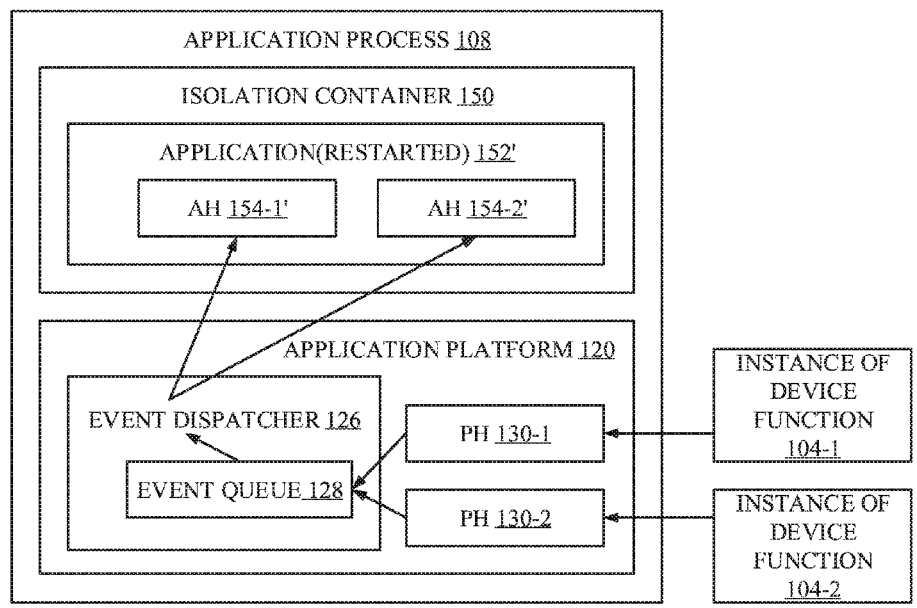

FIG. 15 is a block diagram depicting the flow of events fired by an instance of a device function at a post restart phase (FIG. 15A) and a post registration of a new application's event handlers phase (FIG. 15B) in accordance with at least one embodiment of the invention. As depicted in FIG. 15A, at step S927 of FIG. 13, application 152 may request application platform 120 to register a new AH 154 for the designated instance of device function 104 based on the usage context. At step S928 of FIG. 13, in response to receiving the request from application 152, application platform 120 may record the new AH 154 associated with the identifier of the instance of device function 104 to event handler table 124. In this scenario, after confirming that application 152 has finished registering all AH's 154 for all of the instances of device functions 104 registered before the failure at step S929 of FIG. 13, at step S930 of FIG. 13, application platform 120 may start dispatching one or more events to application 152.

At step S931 of FIG. 13, application 152 may request application platform 120 to operate the designated instance of device function 104 as used before the failure. In an embodiment, application 152 may operate the instance of device function 104 used before the failure by passing the identifier included in the usage context to the API. In an alternative embodiment, application 152 may prepare data to pass to the API based on the data included in the usage context. In response to receiving the request from application 152, application platform 120 may operate the designated instance of device function 104 at step S932 of FIG. 13 and record the usage data to context table 122 at step S933 of FIG. 13.

As depicted in FIG. 15B, the events fired by the instance of device function 104 may again be continuously delivered to application 152 via PH 130, event receiver 142, event queue 128, event dispatcher 126 and AH 154.

It should be appreciated that embodiments according to the present invention may maintain application process 108 and the usage data located in the memory region of application process 108 while application 152 is in the process of restarting.

In an embodiment of the invention, the events are always enqueued into event queue 128, and dispatching of the events may be delayed until a new AH 154 for the instance registered before the failure is registered by application 152 when application 152 restarts. However, in alternative embodiment, the events may be enqueued into event queue 128 only after application platform 120 restarts application 152. Accordingly, dispatching of the events for each instance may begin after a new AH 154 for the corresponding instance is registered by application 152 after the restart. In embodiments of the invention, an event delivered from an instance during an unavailability period associated with restarting application 152 is enqueued in event queue 128. An unavailability period may generally be understood as a period in which application 152 is nonresponsive (i.e., a period from the failure to the operation of an instance by application 152). It should be appreciated that embodiments of the current invention may handle application terminations resulting from exception errors and insufficient memory.

In an embodiment of the invention, operation module 136 may relay operation requests for operating the instance between application 152 and the instance of device function 104 each time a request is demanded. In an embodiment of the invention, operation module 136 may create a thread or timer that issues an operation request to the instance of device function 104 as necessary without explicit requests from application 152. In an embodiment of the invention, in response to receiving a request for operating the instance, at least one of a thread and a timer may be generated for continuously issuing an operation request to be performed for the instance of the device function. For example, a thread or timer may be a thread or timer for playback of designated songs, a thread or timer for tracking a vehicle's position and thereby indicate the position of the vehicle on a map via an icon, or a thread or timer to notify an individual that the vehicle has entered the vicinity of a designated location.

During the creation of a thread or timer, operation module 136 may record the identifier of the thread or timer into context table 122 corresponding to the identifier of the instance of device function 104. The data created by the thread or timer may also be recorded in context table 122 as usage data. For example, if multiple files of songs are designated for continuous playback, operation module 136 may record the current file name of the song as each subsequent song if played.

It should be appreciated that since the thread or timer may be executed in the memory region logically external to the isolation container 150, the thread or timer may continue to issue operation requests to the instance of device function 104 even while application 152 is in the process of restarting. Accordingly, the instance of device function 104 may be continuously operated during the restart of application 152. The thread or timer may be terminated and the identifier of the thread or time may be deleted from context table 122 when application platform 120 receives an explicit request or deallocates the instance of device function 104.

Figure 16:
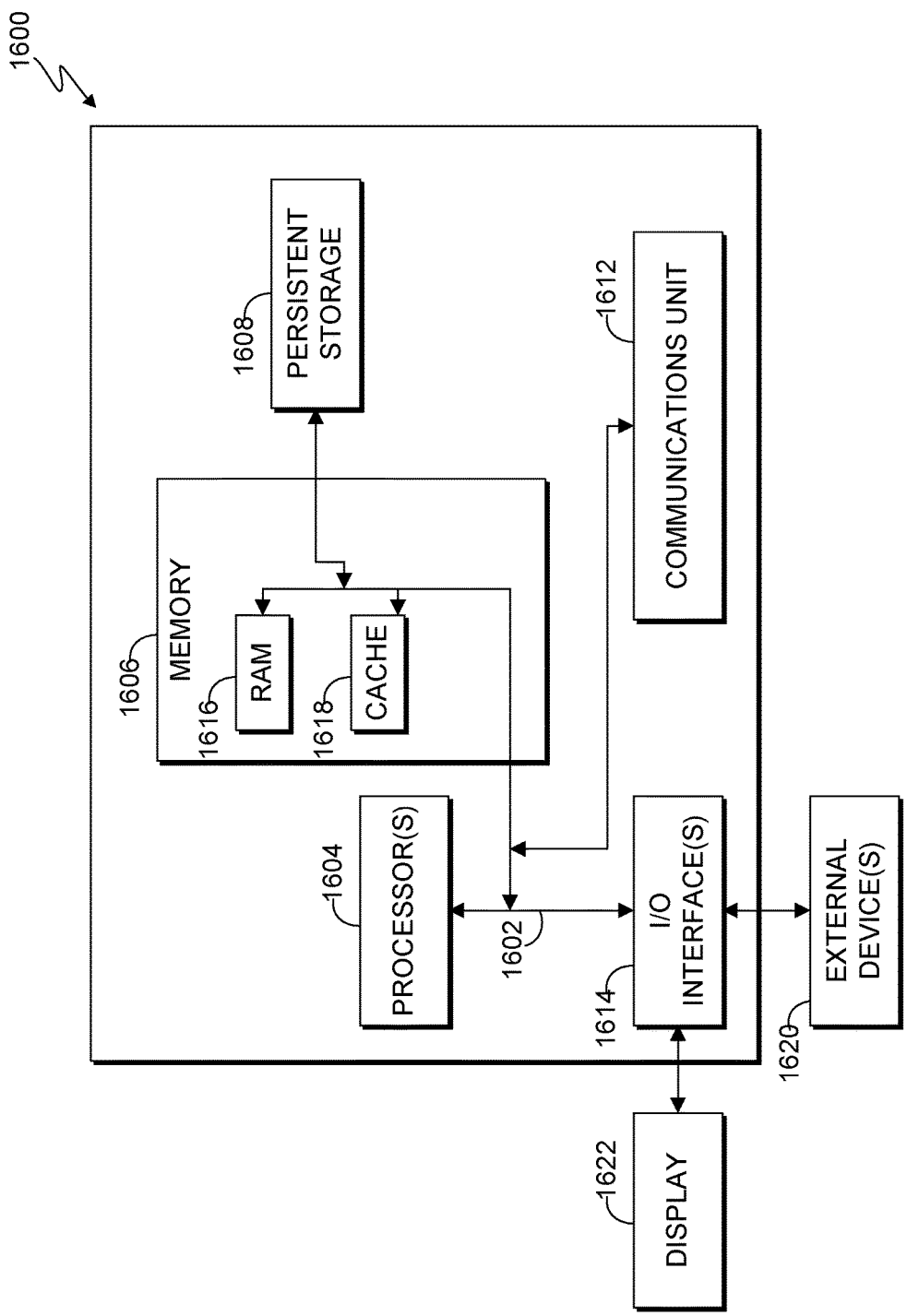
FIG. 16 is a block diagram depicting components of a computer 1600 suitable for executing at least one embodiment in accordance with the present invention.

FIG. 16 is a block diagram depicting components of a computer 1600 suitable for executing at least one embodiment in accordance with the present invention. FIG. 16 displays the computer 1600, one or more processor(s) 1604 (including one or more computer processors), a communications fabric 1602, a memory 1606 including, a RAM 1616, and a cache 1618, a persistent storage 1608, a communications unit 1612, I/O interfaces 1614, a display 1622, and external devices 1620. It should be appreciated that FIG. 16 provides only an illustration of one embodiment and does not imply any limitations with regard to the environments in which different embodiments may be implemented. Many modifications to the depicted environment may be made.

As depicted, the computer 1600 operates over the communications fabric 1602, which provides communications between the computer processor(s) 1604, memory 1606, persistent storage 1608, communications unit 1612, and input/output (I/O) interface(s) 1614. The communications fabric 1602 may be implemented with any architecture suitable for passing data or control information between the processors 1604 (e.g., microprocessors, communications processors, and network processors), the memory 1606, the external devices 1620, and any other hardware components within a system. For example, the communications fabric 1602 may be implemented with one or more buses.

The memory 1606 and persistent storage 1608 are computer readable storage media. In the depicted embodiment, the memory 1606 comprises a random access memory (RAM) 1616 and a cache 1618. In general, the memory 1606 may comprise any suitable volatile or non-volatile one or more computer readable storage media.

Program instructions and data used to practice embodiments of the present invention may be stored in the persistent storage 1608, or more generally, any computer readable storage media, for execution by one or more of the respective computer processors 1604 via one or more memories of the memory 1606. The persistent storage 1608 may be a magnetic hard disk drive, a solid state disk drive, a semiconductor storage device, read-only memory (ROM), electronically erasable programmable read-only memory (EEPROM), flash memory, or any other computer readable storage media that is capable of storing program instructions or digital information.

The media used by the persistent storage 1608 may also be removable. For example, a removable hard drive may be used for persistent storage 1608. Other examples include optical and magnetic disks, thumb drives, and smart cards that are inserted into a drive for transfer onto another computer readable storage medium that is also part of the persistent storage 1608.

The communications unit 1612, in these examples, provides for communications with other data processing systems or devices. In these examples, the communications unit 1612 may comprise one or more network interface cards. The communications unit 1612 may provide communications through the use of either or both physical and wireless communications links. In the context of some embodiments of the present invention, the source of the various input data may be physically remote to the computer 1600 such that the input data may be received and the output similarly transmitted via the communications unit 1612.

The I/O interface(s) 1614 allow for input and output of data with other devices that may operate in conjunction with the computer 1600. For example, the I/O interface 1614 may provide a connection to the external devices 1620, which may be as a keyboard, keypad, a touch screen, or other suitable input devices. External devices 1620 may also include portable computer readable storage media, for example thumb drives, portable optical or magnetic disks, and memory cards. Software and data used to practice embodiments of the present invention may be stored on such portable computer readable storage media and may be loaded onto the persistent storage 1608 via the I/O interface(s) 1614. The I/O interface(s) 1614 may similarly connect to a display 1622. The display 1622 provides a mechanism to display data to a user and may be, for example, a computer monitor.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of computer program instructions, which comprises one or more executable instructions for implementing the specified logical function(s). In some alternative implementations, the functions noted in the block may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A computer program product, the computer program product comprising one or more computer readable storage media and program instructions stored on said one or more computer readable storage media, said program instructions comprising instructions to:
   run a software unit in an isolation container located on a software platform;
   allocate an instance of a device function instantiated by the software platform to the software unit;
   store usage data associated with the instance to a memory region logically external to the isolation container, the usage data being generated by the software unit operating the device function;
   detect a failure of the software unit;
   responsive to detecting the failure, restart the software unit based, at least in part, on instructions to:
      provide the software unit with the usage data;
      enqueue an event delivered from the instance during an unavailability period associated with restarting the software unit in an event queue; and
      dispatch the event from the event queue to the software unit, wherein dispatching is delayed until a new software event handler corresponding to a software event handler registered with the instance prior to the failure is registered by the software unit.

2. The computer program product of claim 1, wherein:
   the event dispatcher operates on the software platform; and
   the event dispatcher is executed on a dedicated thread, wherein the event dispatcher serially dequeues and dispatches the event from the event queue.

3. The computer program product of claim 2, wherein the thread of the event dispatcher is terminated in response to the failure.

4. The computer program product of claim 2, wherein a new thread is generated in response to restarting the software unit.

5. The computer program product of claim 1, further comprising instructions to:
   receive the event by a platform event handler operating on the software platform, the event comprising at least one of the identifying information of the instance from which the event was delivered and event data generated by the instance;
   register the platform event handler with the instance of the device function; and
   store the event data as usage data, the event data being generated by the software unit operating the device function.

6. A computer system, the computer system comprising:
one or more computer processors;
one or more computer readable storage media;
computer program instructions;
said computer program instructions being stored on said one or more computer readable storage media;
said computer program instructions comprising instructions to:
run a software unit in an isolation container located on a software platform;
allocate an instance of a device function instantiated by the software platform to the software unit;
store usage data associated with the instance to a memory region logically external to the isolation container, the usage data being generated by the software unit operating the device function;
detect a failure of the software unit;
responsive to detecting the failure, restart the software unit based, at least in part, on instructions to:
provide the software unit with the usage data;
enqueue an event delivered from the instance during an unavailability period associated with restarting the software unit in an event queue; and
dispatch the event from the event queue to the software unit, wherein dispatching is delayed until a new software event handler corresponding to a software event handler registered with the instance prior to the failure is registered by the software unit.

* * * * *